US012692718B2

(12) United States Patent
Clark et al.

(10) Patent No.: US 12,692,718 B2
(45) Date of Patent: Jul. 28, 2026

(54) ADJUSTABLE MOUNTING SYSTEM FOR A DOOR LOCK

(71) Applicant: ASSA ABLOY Access and Egress Hardware Group, Inc., New Haven, CT (US)

(72) Inventors: Douglas Clark, Wallingford, CT (US); Andrew S. Geraci, Middlefield, CT (US); Rick Leites, Milford, CT (US); Scott Morstatt, Maryville, TN (US); Eric Palmieri, Rocky Hill, CT (US); Sharath Kumar Ramachandran, Rocky Hill, CT (US); Jeffrey Rodriguez, Newington, CT (US)

(73) Assignee: ASSA ABLOY Access and Egress Hardware Group, Inc., New Haven, CT (US)

( * ) Notice: Subject to any disclaimer, the term of this patent is extended or adjusted under 35 U.S.C. 154(b) by 54 days.

(21) Appl. No.: 18/633,917

(22) Filed: Apr. 12, 2024

(65) Prior Publication Data

US 2024/0344355 A1 Oct. 17, 2024

Related U.S. Application Data

(60) Provisional application No. 63/459,527, filed on Apr. 14, 2023.

(51) Int. Cl.

| | |
|---|---|
| ***E05B 9/08*** | (2006.01) |
| ***E05B 15/02*** | (2006.01) |
| ***E05B 65/10*** | (2006.01) |

(52) U.S. Cl.
CPC .............. *E05B 9/082* (2013.01); *E05B 15/02* (2013.01); *E05B 65/10* (2013.01)

(58) Field of Classification Search
CPC . E05B 9/08; E05B 9/082; E05B 65/10; E05B 15/02
See application file for complete search history.

(56) References Cited

U.S. PATENT DOCUMENTS 2,759,754 A * 8/1956 Kaiser ...................... E05B 3/003 292/357
4,129,019 A * 12/1978 Urdal ...................... E05B 59/00 70/462

(Continued)

OTHER PUBLICATIONS

Invitation to Pay Additional Fees for International Application No. PCT/US2024/024226 dated Jul. 8, 2024.

(Continued)

*Primary Examiner* — Christine M Mills
*Assistant Examiner* — Faria F Ahmad
(74) *Attorney, Agent, or Firm* — Wolf, Greenfield & Sacks, P.C.

(57) ABSTRACT

A mounting system for a door lock is provided. The mounting system may include a chassis having a pocket and an attachment bracket. The attachment bracket may include at least one attachment post extending parallel to an attachment post axis and a retaining plate affixed to the at least one attachment post. The attachment bracket may move relative to the chassis between at least a first position and a second position to provide different mounting patterns for a variety of associated door lock components such as exit devices or trims.

13 Claims, 11 Drawing Sheets

(56) References Cited

U.S. PATENT DOCUMENTS 4,813,250 A * 3/1989 Yeh ........................ E05B 9/082 70/451
5,220,816 A * 6/1993 Fish .......................... E05B 9/08 70/214
5,445,423 A * 8/1995 Mader ..................... E05C 9/185 292/336.5
5,658,026 A * 8/1997 Nigro, Jr. .............. E05B 13/002 70/210
5,695,227 A * 12/1997 Smallegan ............. E05B 15/02 292/336.3
5,881,585 A * 3/1999 Kang ...................... E05B 59/00 70/451
5,881,586 A * 3/1999 Shen ....................... E05B 53/00 70/462
6,826,937 B2 * 12/2004 Su .......................... E05B 9/082 70/451
7,380,847 B2 * 6/2008 Rodriguez .......... E05B 63/0043 292/357
10,161,162 B2 * 12/2018 Schaeffer .................. E05B 9/08
D851,196 S * 6/2019 Chester ........................ D22/108
10,767,392 B2 * 9/2020 Aguirrezabala Olasagasti ........... E05B 9/08
2002/0088084 A1 7/2002 Armstrong
2003/0011201 A1 1/2003 Rodriguez et al.
2003/0056557 A1 * 3/2003 Squier ................ G07C 9/00896 70/451
2006/0038419 A1 * 2/2006 Lee ......................... E05B 15/02 292/357
2008/0116699 A1 * 5/2008 Karcher .................... E05B 3/06 292/357
2015/0240530 A1 8/2015 Mani et al.
2016/0340930 A1 11/2016 Schaeffer et al.
2025/0003257 A1 * 1/2025 Woodley ................. E05B 65/10

OTHER PUBLICATIONS

International Search Report and Written Opinion mailed Sep. 20, 2024 for International Application No. PCT/US2024/024226.

* cited by examiner

ADJUSTABLE MOUNTING SYSTEM FOR A DOOR LOCK

RELATED APPLICATIONS

This Application claims the benefit under 35 U.S.C. 119 (e) of U.S. Provisional Application No. 63/459,527, filed Apr. 14, 2023, and entitled "ADJUSTABLE MOUNTING SYSTEM FOR A DOOR LOCK," the entire of contents of which is incorporated herein by reference.

FIELD

Disclosed embodiments are related to door locks and specifically to mounting systems for door locks as well as related method of use.

BACKGROUND

Door locks are used to provide or control access to a door. Door locks may be placed on both sides of a door and/or used in combination with exit devices. In such arrangements, a door lock may be operatively coupled to an exit device such that the door lock may be used to operate the exit device.

SUMMARY

In some embodiments, the techniques described herein relate to a mounting system for a door lock, the mounting system including a chassis including a pocket and a sliding attachment bracket. The sliding attachment bracket may include at least one attachment post extending parallel to an attachment post axis and a retaining plate affixed to the at least one attachment post, where the pocket is configured to receive the retaining plate, where the pocket is configured to allow the retaining plate to slide orthogonal to the attachment post axis, and where the pocket is further configured to inhibit rotation of the retaining plate about the attachment post axis.

In some embodiments, the techniques described herein relate to a mounting system for a door lock, the mounting system including a chassis, a fastener, and an attachment bracket configured to move between a first position and a second position relative to the chassis. The attachment bracket may include at least one attachment post extending along an attachment post axis, a retaining plate affixed to the at least one attachment post, a first hole, and a second hole, where the chassis further includes at least one aperture through which the at least one attachment post passes, where the chassis further includes a third hole and a fourth hole, where when the attachment bracket is in the first position the first hole aligns with the third hole to allow the fastener to be received through the third hole into the first hole, and where when the attachment bracket is in the second position the second hole aligns with the fourth hole to allow the fastener to be received through the fourth hole into the second hole.

In some embodiments, the techniques described herein relate to a method of mounting a door lock, the method including moving an attachment bracket from a first position relative to a chassis to a second position relative to the chassis, where the attachment bracket includes a retaining plate and at least one attachment post affixed to the retaining plate, and where in the first position the at least one attachment post is configured to receive a first fastener from a first exit device, and receiving a second fastener from a second exit device in the at least one attachment post when the attachment bracket is in in the second position.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
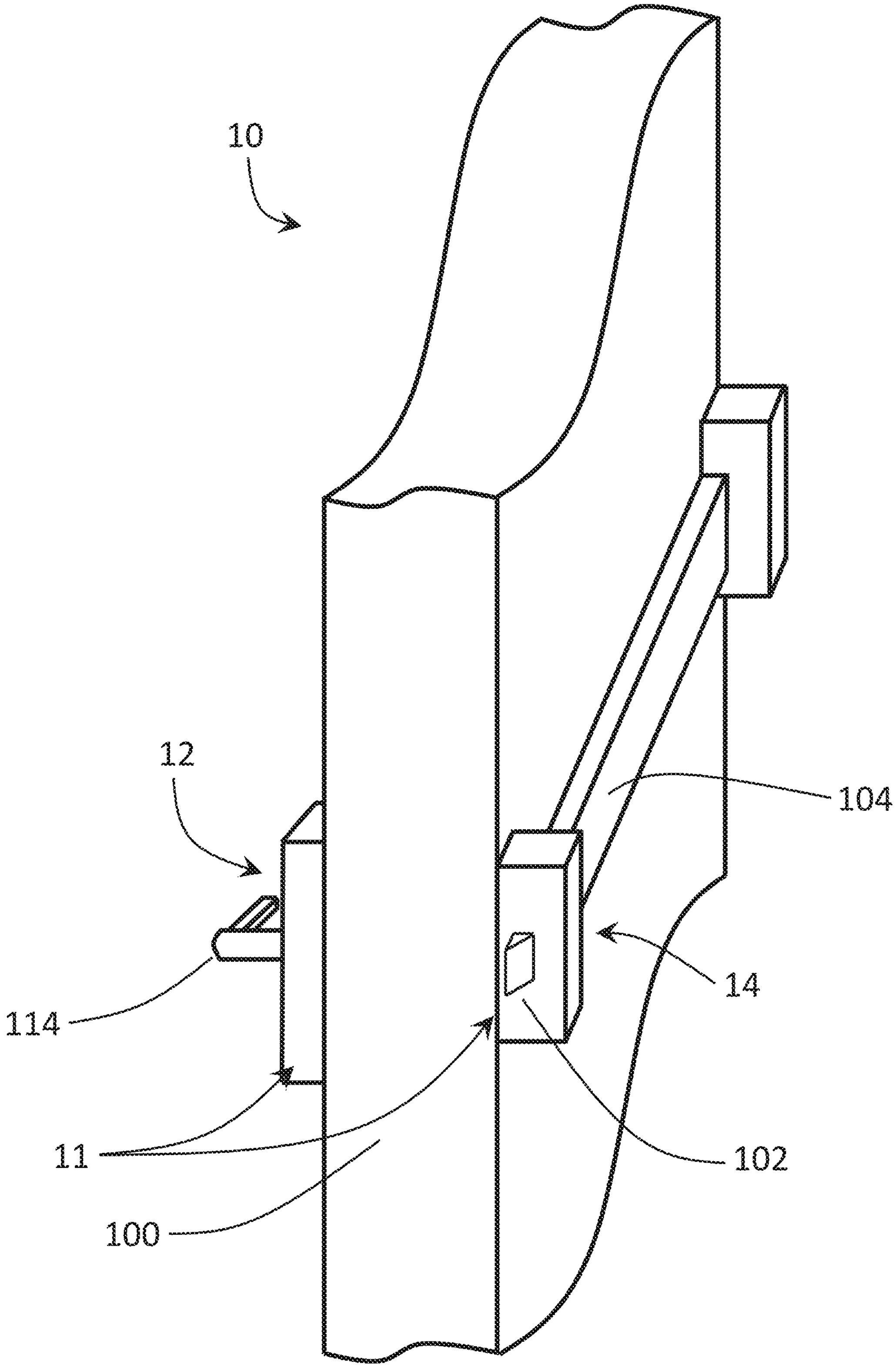
FIG. 1 shows a perspective view of a door including an embodiment of a door lock trim and an exit device.

A door lock from controlling access through a door may include multiple components such as exit devices, interior trims, exterior trims, etc. Multiple components may be combined with one another to form a door lock used to selectively secure a door. For example, a trim may be combined with an exit device to form a door lock. In such an example, a door lock may include an exterior trim on an exterior side of a door and an exit device on an opposing interior side of the door. In such cases, the trim on one side of a door and an exit device on another side of the door are operably connected for mounting to a door as well as to operatively couple the trim to the exit device to provide door latch function. In some cases, certain combinations of trims and/or exit devices would be compatible with each other. That is, certain trims and/or exit devices may be compatible with one another to be used together on a same door, except that there may be differences in mounting patterns between certain trims and exit devices. In some cases, trims are designed for specific exit devices have a predetermined mounting pattern, and accordingly trims may not be interchangeable between different exit devices. Likewise, exit devices may be designed for specific trims, and accordingly exit devices may not be interchangeable with trims.

In view of the above, the inventors have recognized and appreciated in the benefits of a mounting system for door locks that may enhance compatibility of trims and/or exit devices which otherwise may not be suitable for use in the same door installation due to differences in mounting patterns. Specifically, the inventors have appreciated the benefits of a door lock including a trim having an adjustable mounting pattern, such that the trim may be universal or otherwise mount to a wide variety of exit devices. According to some embodiments, a door lock mounting system may include a chassis. A sliding attachment bracket may be at least partially disposed within the chassis and permitted to translate within a mounting plane of the trim (e.g., a plane parallel to a plane of the associated door). A portion of the sliding attachment bracket may extend outside of the chassis on a door facing side of the chassis. The outside extending portion of the sliding attachment bracket may include one or more attachment posts which may pass through a corresponding number of apertures, such as slots, in the chassis. The attachment posts may interact with a door or with a mating trim or exit device on an opposite side of the door to mount the trim to the door lock or exit device.

It should be noted that while exemplary embodiments here describe a mounting system for a door lock with respect to a trim configured to mount to an exit device, it should be noted that such a mounting system may be employed on any component of a door lock to allow for compatibility between different mounting patterns. For example, an exit device may include a mounting system according to exemplary embodiments herein. Additionally, a mounting system according to exemplary embodiments herein may allow a trim to mount to other trims with different mounting patterns.

In some embodiments, a sliding attachment bracket may include a retaining plate rigidly affixed to the one or more attachment posts. The chassis may include a pocket to receive the retaining plate and to restrict movement of the retaining plate such as to permit the sliding attachment bracket to move within a range and to inhibit movement in other directions, such as rotation about an axis of the at least one attachment post.

According to some embodiments, the sliding attachment bracket may be set, held, or biased into one of a plurality of positions. Each position may correspond to a mounting pattern or mounting configuration of a potential mating door lock component such as an exit device. The sliding attachment bracket may be set into one position such as with a fastener such as a screw and may be moved between positions without disassembling surrounding chassis of the door lock component (e.g., trim). Some embodiments may enable the sliding attachment bracket to be repositioned by moving a screw between different locations. Each location may correspond with a single unique position of the sliding attachment bracket such that the fastener (e.g., a screw, pin, etc.) may be received only into the fastener location corresponding with a single position of the sliding attachment bracket. In some embodiments, the fastener may be received into a hole within the chassis and pass into an aligned hole in the sliding attachment bracket. The hole in the chassis may be a clearance hole for a screw fastener and the aligned hole in the sliding attachment bracket may be a threaded hole. The chassis may include a number of holes corresponding to a number of potential positions of the sliding attachment bracket. Each hole in the chassis may align with a hole in the sliding attachment bracket in a single unique position of the sliding attachment bracket such that only one fastener is engaged in one hole at one time. For instance, in some embodiments a sliding attachment bracket move between two positions. The sliding attachment bracket may include a first hole and a second hole. The chassis may include a third hole and a fourth hole. When the sliding attachment bracket is in a first position in the pocket, the first hole aligns with the third hole to allow the fastener to be received through the third hole into the first hole. When the sliding attachment bracket is in a second position the second hole aligns with the fourth hole to allow the fastener to be received through the fourth hole into the second hole, and the first hole is not aligned with the third hole when the second hole is aligned with the fourth hole. In such an embodiment, a user may view the fastener location to ascertain the position of the sliding attachment bracket. In other embodiments, the sliding attachment bracket may be biased into one of the plurality of positions by a detent or another biasing element.

According to some embodiments herein, a trim is a component of a door lock mounted on a surface of a door. A trim may include a door handle, knob lever, pull, or other user interface which may be at least partially surrounded by an escutcheon is some embodiments. A key cylinder or other access control components may be part of the trim. A trim may be an interior trim or exterior trim and may be used on an exterior or interior side of a door, respectively. A trim may or may not include a locking functionality (e.g., via a key cylinder). A trim may be installed on either of a push to open or pull to open side of a hinged door.

According to some embodiments herein, an exit device may include a push bar, a paddle or other structure on which a user may press or push to unlatch and or open a door. An exit device may allow a door to be opened by contacting the exit device with a portion of the body or an object such that user dexterity may not be necessary to operate the door. Exit devices may be used on a push to open side of a door. For example, an exit device may be employed on an interior side of the door.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 shows a perspective view of a door 10 including a door lock 11 having a trim 12 and an exit device 14. The trim 12 is mounted to an exterior side of the door 10 and the exit device 14 is mounted to an interior side of the door 100. The trim 12 and the exit device 14 are operably connected such that either side of the door lock/exit device may be used to retract a latch 102 allowing the door to be opened. As shown in FIG. 1, the trim 12 includes a handle 114 that may be rotated by a user to retract the latch 102 to allow the door 10 to be opened. In some embodiments a knob or lever may be used in place of a handle. The exit device 14 includes a push bar 104 may be depressed by a user to retract the latch 102 and allow the door to be opened. According to other embodiments, a door lock may include a trim having a handle on both sides of a door, or other combinations of a trim and an exit device.

Figure 2:
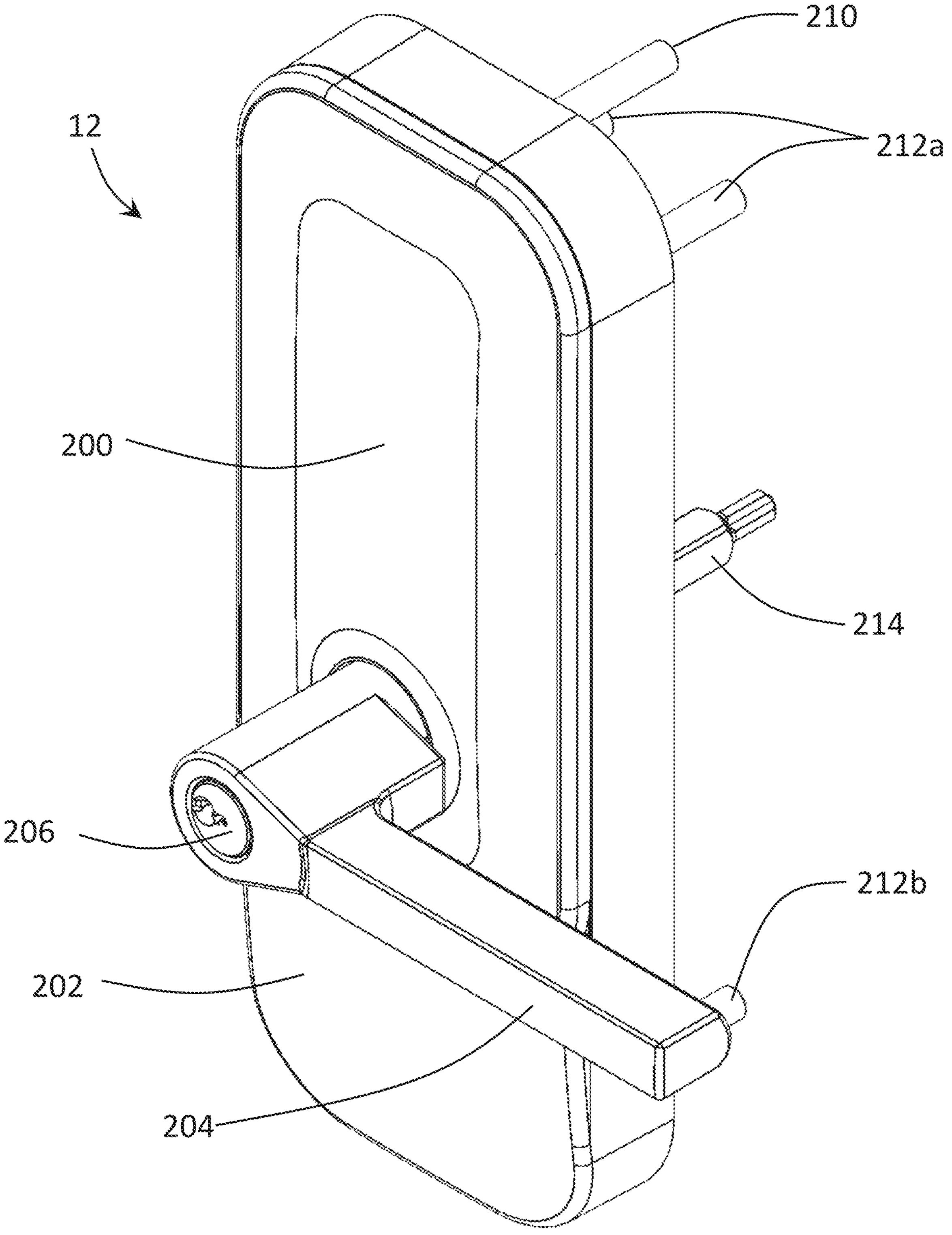
FIG. 2 shows a perspective view of an embodiment of a door lock trim removed from a door.

FIG. 2 shows a door-facing perspective view of an embodiment of a trim 12 of a door lock removed from the door. The trim 12 includes a chassis 202, a control assembly 200 (see also FIG. 3), a fixed attachment post 210, an upper sliding attachment bracket 212*a* and a lower sliding attachment bracket 212*b* (see also FIGS. 5 and 8). According to the embodiment of FIG. 2, the trim also includes a door handle 204 and a key cylinder 206 coupled to the control assembly 200. The trim also includes a tailpiece 214 that operatively connects the trim 12 to another portion of the door lock, door latch, or exit device such as may be on an opposing face on an opposite side of the door. Turning the door handle 204 when the lock is in an unlocked state rotates the tailpiece 214 which may unlatch the door, such as latch 102 in FIG. 1. Likewise, a user may push on a push bar (for example see push bar 104 in FIG. 1) of an exit device to retract a latch and simultaneously push the door open.

Figure 3:
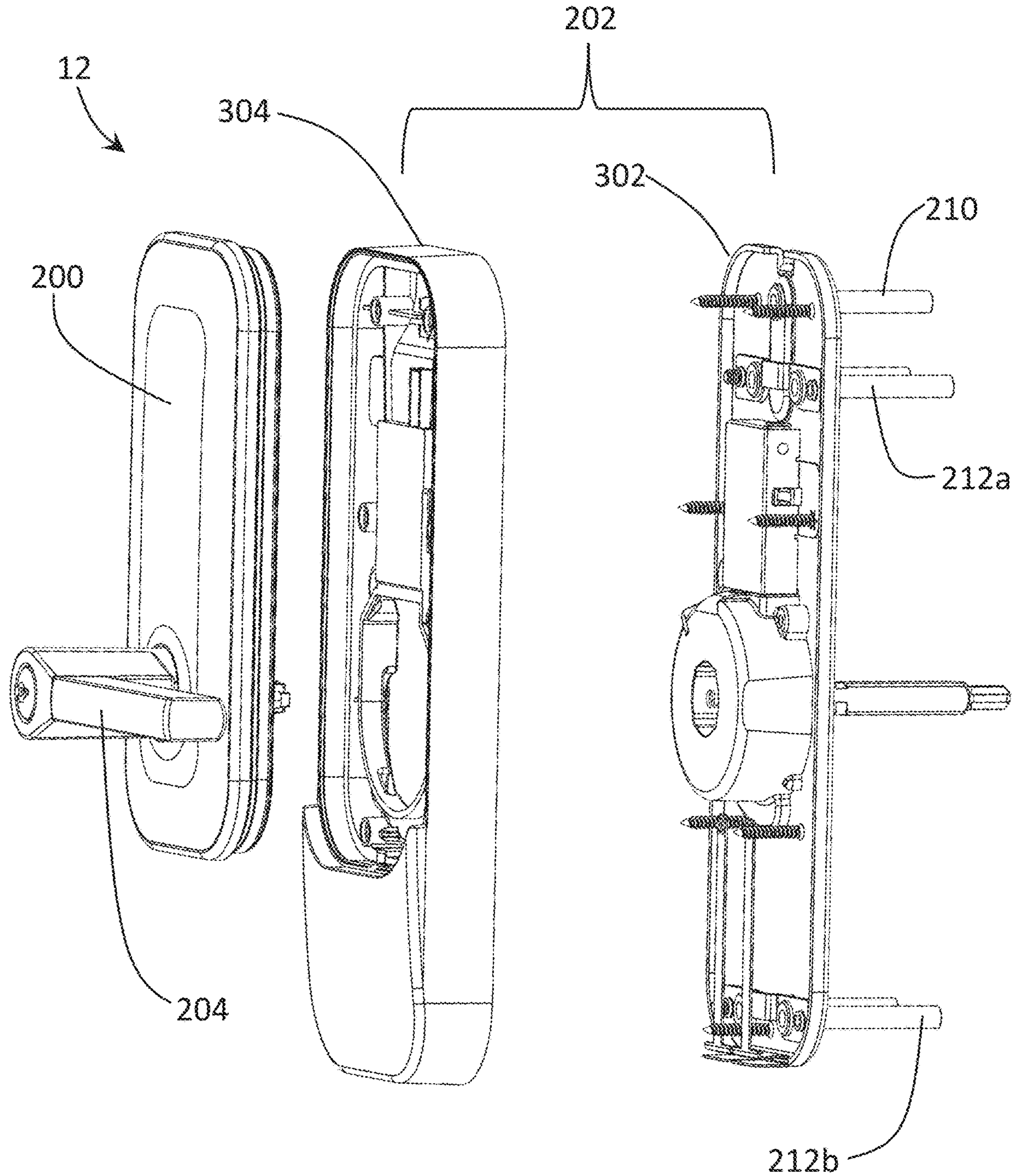
FIG. 3 shows an exploded perspective view of the door lock trim of FIG. 2.

FIG. 3 shows an exploded perspective view of the trim 12 of FIG. 2 showing the control assembly 200 and the chassis 202. The chassis 202 includes an escutcheon 304 and a mounting plate 302. The control assembly 200 includes the door handle 204, the control assembly may additionally include components such as a key cylinder, lock status indicators etc. Chassis 202 receives and supports the control assembly into the escutcheon 304. In some embodiments, the control assembly may be removed such as to switch between a door knob and door handle or for other purposes. The mounting plate 302 is received into a door facing side of the escutcheon 304. The mounting plate may support the fixed attachment post 210, such that the fixed attachment post 210 is rigidly fixed on the mounting plate. The sliding attachment brackets 212*a*, 212*b* may be held by the chassis 202 being disposed between the mounting plate 302 and the escutcheon 304 with a portion of each sliding mounting plate extending through apertures in the mounting plate (for example, see FIG. 6). The sliding attachment brackets 212*a*, 212*b* may be retained within a pocket in the chassis 202 (for example, see FIG. 8). The pocket may allow the sliding attachment bracket 212*a* and/or sliding attachment bracket 212*b* to translate within a plane parallel to a mounting surface of the door. However, in some embodiments, the pocket may inhibit movement of the sliding attachment bracket in other directions and/or inhibit rotation of the sliding attachment bracket within the plane parallel with the mounting surface of the door. In some embodiments, the pocket may inhibit rotation of the attachment bracket about an attachment post axis along which an attachment post of the sliding attachment bracket extends. In some embodiments, one or more attachment posts may extend parallel to the attachment post axis. According to some embodiments, a guiding surface may inhibit movement of the sliding attachment bracket in other directions and/or inhibit rotation of the sliding attachment bracket within the plane parallel with the mounting surface of the door. The guiding surface may form a portion of the pocket or may be a separate structure. According to some embodiments, the pocket may be bounded by posts, pins, tabs or other protrusions and may not be recessed into the chassis in all embodiments.

Figure 4:
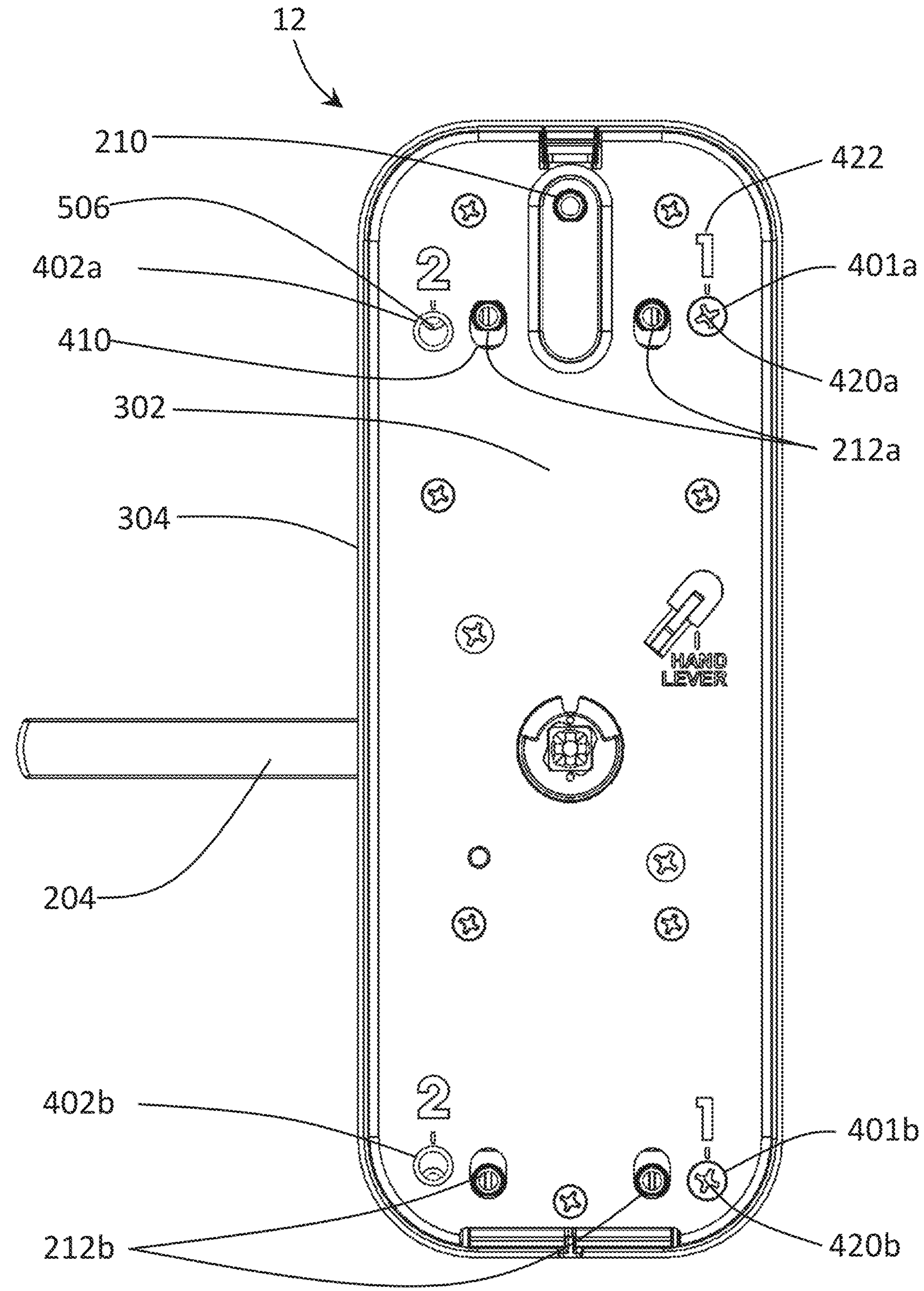
FIG. 4 shows a rear view of the door lock trim for FIG. 2.

FIG. 4 shows a rear view of the trim according the embodiment of FIG. 3. The mounting plate 302 forms the door-facing surface of the trim 12. The escutcheon 304 surrounds the mounting plate 302. Distal end portions of the upper and lower sliding attachment brackets 212*a*, 212*b*, respectively are visible extending through apertures 410. The fixed attachment post 210 is illustrated affixed to the mounting plate 302. The apertures 410 may be in the form of slots in the mounting plate 302 that may allow the sliding attachment brackets to translate a distance. As illustrated, the upper and lower sliding attachment brackets 212*a*, 212*b*, respectively slide in a direction along a length of a door onto which the trim may be mounted (that is the upper and lower sliding attachment brackets move in a vertical direction), allowing the trim 12 to mount with another portion of the door lock or exit device. The sliding of the upper and lower sliding attachment brackets 212*a*, 212*b* allows a vertical spacing measured between the attachment posts of the two brackets to be adjusted to accommodate different mounting patterns. The associated other trim or exit device may have a mounting pattern within the range of travel of the sliding attachment brackets of trim 12. The other trim or exit device may be located on an opposite face of a door from trim 12, as illustrated in FIG. 1, for example.

While the illustrated embodiment depicts a trim with a pair of sliding attachment brackets configured to translate along a length of a door, other embodiments are contemplated. For instance, any number of sliding attachment brackets may be used, including sliding attachment brackets with one mounting point (e.g., one attachment post), two mounting points (as illustrated) or more than two mounting points per sliding attachment bracket. In the case of two or more attachment posts, the attachment posts may be horizontally spaced in a direction along a width of a door. Sliding attachment brackets may move along the length of the door (as illustrated) along the width of the door (e.g., horizontally when installed) or a combination of both directions. Apertures may be oblong slots (apertures 410 as illustrated), round openings or openings which may guide (or block) a sliding attachment bracket in a specific direction or directions such as a diagonal slot, an L shaped slot, a Y shaped slot, an E shaped slot, a D shaped opening etc.

Each sliding attachment bracket such as the upper and lower sliding attachment brackets 212*a*, 212*b* may have two or more predetermined mounting positions which may correspond with a potential mating trim/exit device. As illustrated in FIG. 4, each sliding attachment bracket of trim 12 has two mounting positions. The illustrated positions correspond with each sliding attachment bracket 212*a*, 212*b* being near a top or near a bottom of each aperture 410 (see also FIGS. 7A and 7B). Each sliding attachment bracket may be set to one of the predetermined mounting positions such that once in the predetermined mounting position, the sliding attachment bracket may remain in that position until an action is taken, such as removing a fastener or exceeding a threshold force to cause the sliding attachment bracket to move from the predetermined position. As illustrated in FIG. 4, sliding attachment brackets 212*a*, 212*b* are set by the insertion of an upper screw 420*a* and a lower screw 420*b* for the upper and lower sliding attachment brackets, respectively. In some embodiments as shown in FIG. 4, the two predetermined mounting positions may be marked with a marking 422 (for, example 1 and 2), the marking being displayed on the mounting plate 302. In the illustrated embodiment, a pair of fastener holes accompanies each sliding attachment bracket. Looking at the upper sliding attachment bracket 212*a* for example, these holes are a first position fastener hole 401*a* and a second position fastener hole 402*a*. The first position fastener hole 401*a* lines up with a fastener receptacle within the sliding attachment bracket (not visible for the first position, see also FIG. 5). As illustrated, the fastener receptacle is a threaded hole. Screw 420*a* is shown in the threaded hole of the sliding attachment bracket and first position fastener hole 401*a*, setting the sliding attachment bracket 212*a* into the first position. Marking 422 is shown near the first position fastener hole 401*a*, indicating that, for the embodiment shown, the sliding attachment bracket 212*a* is in the position corresponding to a first indicator (e.g., the numeral 1) when the screw 420*a* is in the position fastener hole marked 1. It may be observed from FIG. 4 that the second position fastener hole 402*a* does not line up with a fastener hole 506 (only partially visible through second position fastener hole 402*a*). With the sliding attachment bracket 212*a* in the first position the fastener (e.g., screw 420*a*) will not engage in the second position fastener hole 402*a*. The presence of screw 420*a* in the first position fastener hole 401*a* with accompanying marking 422, and the absence of a screw from the second position fastener hole 402*a* may provide a visual cue to a user to indicate that the sliding attachment bracket is in first position. While the above example was with respect to the upper sliding attachment bracket 212*a*, the arrangement is similar for the lower sliding attachment bracket 212*b*. The lower first position fastener hole 401*b* corresponds with the first position of the lower sliding attachment bracket 212*b*, the lower second position fastener hole 402*b* corresponds with the second position of the lower sliding attachment bracket 212*b*.

According to some embodiments, additional positions of the sliding attachment bracket may be present. Additional position fastener holes may also be present. In some embodiments, fasteners other than screws may be used, such as pins (spring pins, quick release pins, taper pins, cotter pins, etc.), push to insert fasteners (push-in rivets, expanding shank push-in rivets, etc), clips (spring clips, snap rings, etc), wedges, nuts, detents, magnets or other fasteners. For instance, a quick release pin may be inserted between a position fastener hole and an aligning hole in a sliding attachment bracket. In other embodiments, a detent may engage with one or more pockets disposed on a sliding attachment bracket to bias the sliding attachment bracket into a position (for example, see FIG. 8). Similarly, pairs of magnets may be disposed between the chassis and the sliding attachment bracket to bias the sliding attachment bracket into position when the magnets align. According to some embodiments, markings may designate a mounting spacing distance or other information useful to a user such as an installer.

Figure 5:
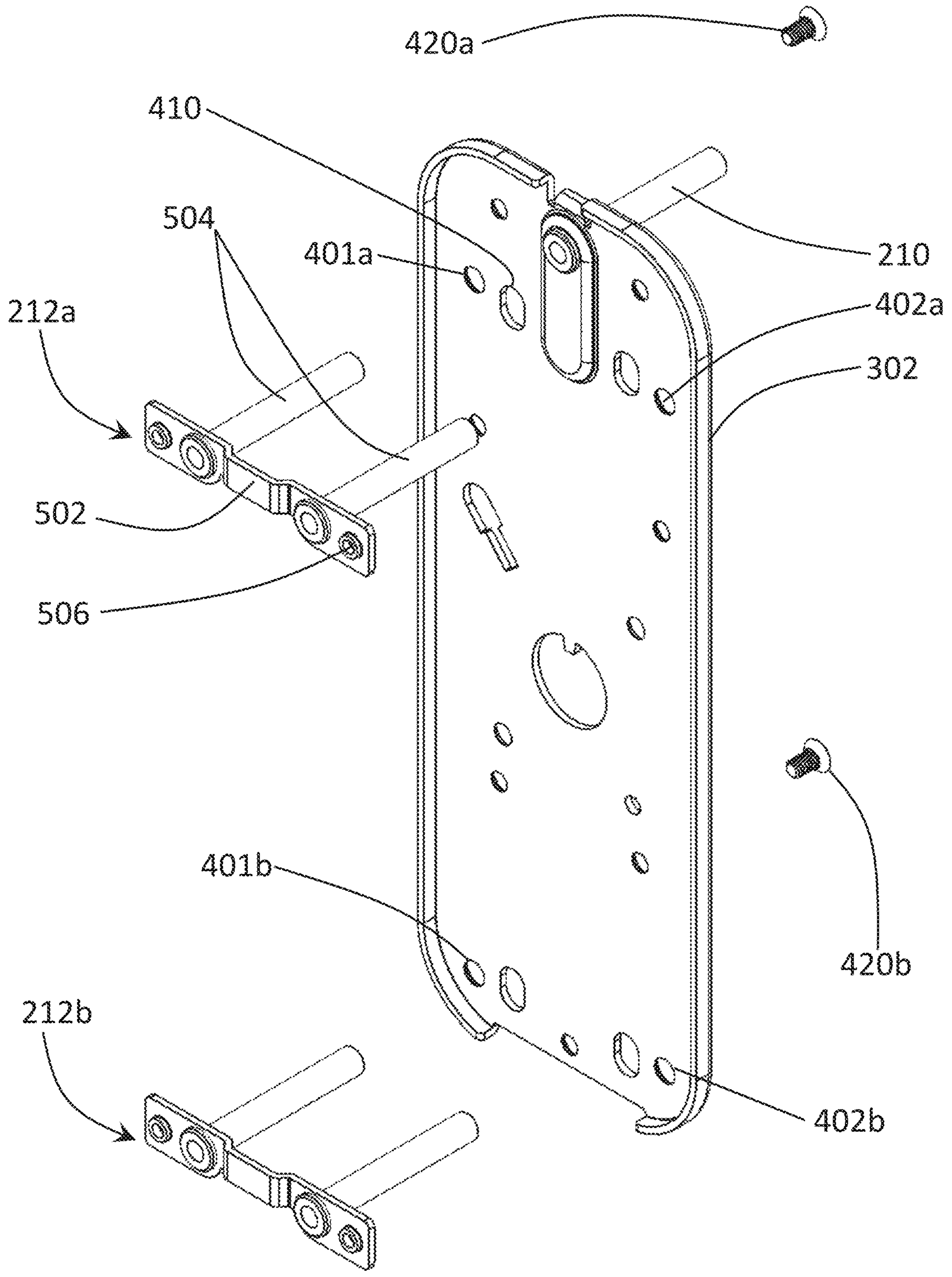
FIG. 5 shows an exploded view of an embodiment of a mounting plate and sliding attachment brackets of the door lock trim.

FIG. 5 shows a door-facing exploded view of the mounting plate and sliding attachment brackets of the embodiment of trim 12 in the previous figures. Mounting plate 302 shows a side facing the escutcheon (not shown here). The upper sliding attachment bracket 212*a* and the lower sliding attachment bracket 212*b* are located partially on the escutcheon side of the mounting plate 302 and partially extending through apertures 410 in the mounting plate. Each sliding attachment bracket 212*a*, 212*b* includes attachment posts 504 rigidly affixed to a retaining plate 502. The retaining plate includes fastener holes 506, which may be threaded holes in the illustrated embodiment. The attachment posts pass through apertures 410 such that a majority of the attachment posts may be on the door side of the mounting plate 302. In the assembled lock, the retaining plate may be disposed between the mounting plate 302 and the escutcheon 304 (see FIGS. 2-3). The sliding attachment bracket may then translate in a plane parallel with the surface of the door but may be substantially retained in a direction normal to the surface of the door, such as to be used to anchor the door lock to the door. In the illustrated embodiment, screws 420*a* and 420*b* set the upper and lower (respectively) sliding attachment brackets in either of the first or second positions by passing through the first position fastener hole 401*a*/401*b* (upper/lower respectively) and into the aligned fastener hole 506 for the first position or by passing through the upper second position fastener hole 402*a* and the lower second position fastener hole 402*b* and into the aligned fastener hole 506 for the second position.

The sliding attachment brackets each include two attachment posts in the illustrated embodiment. Embodiments with other numbers of attachment posts and/or other numbers of sliding attachment brackets are contemplated. In some embodiments a single attachment post may be affixed to a retaining plate. The single attachment post sliding attachment bracket may translate along the length or the width of a door or some combination thereof. Some embodiments may include a single sliding attachment bracket two sliding attachment brackets or greater than two sliding attachment brackets (each with any number of possible attachment posts). In some embodiments, the sliding attachment bracket(s) may translate to vary a spacing of mounting points (e.g., mounting pattern) of the door lock with respect to each other (e.g., a different mounting spacing in one or more directions).

In some embodiments, the attachment posts 504 may be orthogonal to a face of the door to which the trim 12 may be installed. A mounting plane of the lock may correspond to the face of the door when the trim is attached to the door. An attachment post axis may therefore be orthogonal to the face of the door and orthogonal to the mounting plane. The retaining plate 502 may be substantially parallel to the face of the door to which the trim 12 may be installed and orthogonal to the one or more attachment posts. A rear surface of the mounting plate 302 may abut the face of the door to which the trim 12 may be installed. As the retaining plate 502 may be disposed between portions of the chassis 202 (such as the escutcheon 304 and the mounting plate 302) the retaining plate may be maintained parallel to the attachment plane of the trim with the attachment posts remaining orthogonal to the attachment plane of the lock.

The upper and lower sliding attachment brackets 212*a*, 212*b* may be interchangeable with each other and the position may only signify a location that each may presently occupy in a trim as presently assembled. The sliding attachment brackets may be manufactured as a unitary piece or built up from separate pieces. For instance, the sliding attachment bracket may be a single attachment post formed such as a barrel nut or cylindrical fastener including a head or flange that may serve as the retaining plate. The sliding attachment brackets may be manufactured using any convenient process including stamping, machining, casting, molding, injection molding or by other processes and/or combinations of suitable processes.

Figure 6:
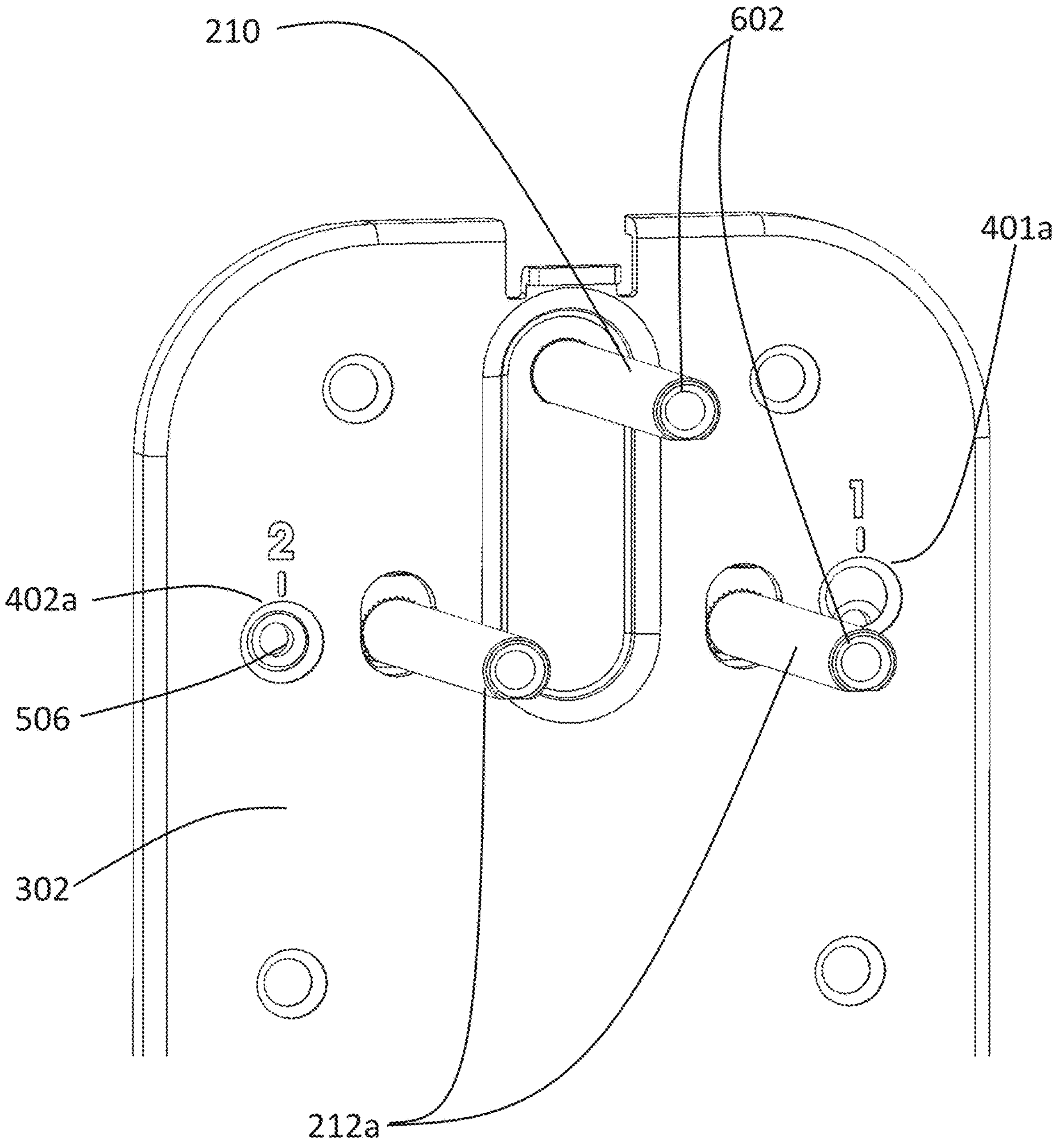
FIG. 6 shows a perspective view of a portion of the mounting plate of FIG. 5.

FIG. 6 shows a perspective view of a portion of a door-facing side of the mounting plate 302 of the embodiment of the previous figures. The figure illustrates the upper sliding attachment bracket 212*a* in the second position. The fastener (e.g., a screw) is omitted from the illustration to show an alignment of the second position fastener hole 402*a* and one of the fastener holes 506. Observation of the first position fastener hole 401*a* shows an intentional misalignment with one of the fastener holes (as the sliding attachment bracket is not in the first position). End portions of the attachment posts (both the fixed attachment post 210 and on the sliding attachment bracket 212*a*) include a mounting hole 602. The mounting hole 602 may be a threaded hole to receive a screw or similar fastener. The fastener may be used to secure the trim to a door or to another trim/exit device. In other embodiments, the end portion of an attachment post may be configured to receive a fastener. The end portion may include a snap ring/spring clip groove, a hole for a pin, wedge or similar fastener, a barbed end or an expanding portion. For instance, a spring clip, snap ring or e-clip may engage a circumferential groove in an end portion of an attachment post to fasten a door lock to a door, exit device, etc. The end portion of the attachment post may be threaded internally (as in the illustrated embodiment) or externally such as to receive a nut or binding barrel. Although FIG. 6 illustrates the upper portion of the mounting plate 302 including the upper sliding attachment bracket 212*a*, the function of the lower portion/lower sliding attachment bracket 212*b* is similar.

Figure 7A:
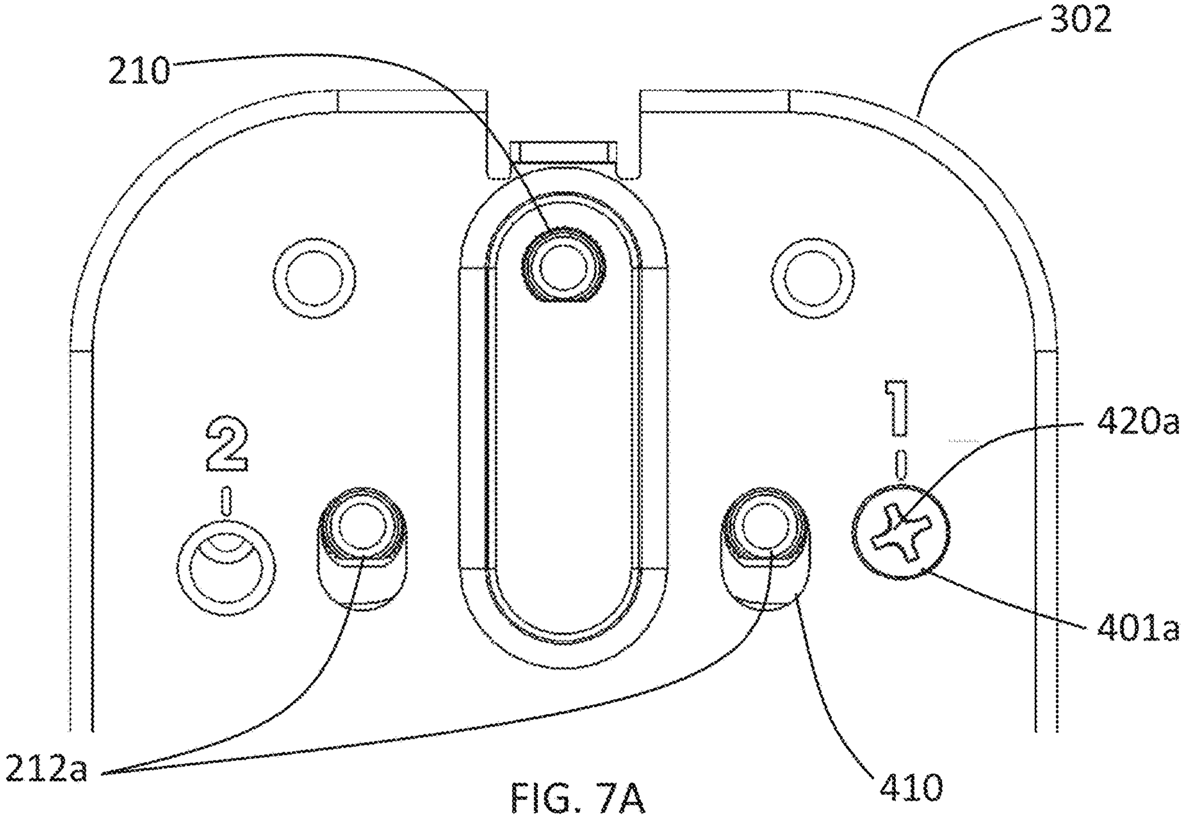
FIG. 7A shows a rear view of an upper portion of the mounting plate of FIG. 5 with the sliding attachment bracket in a first position.
Figure 7B:
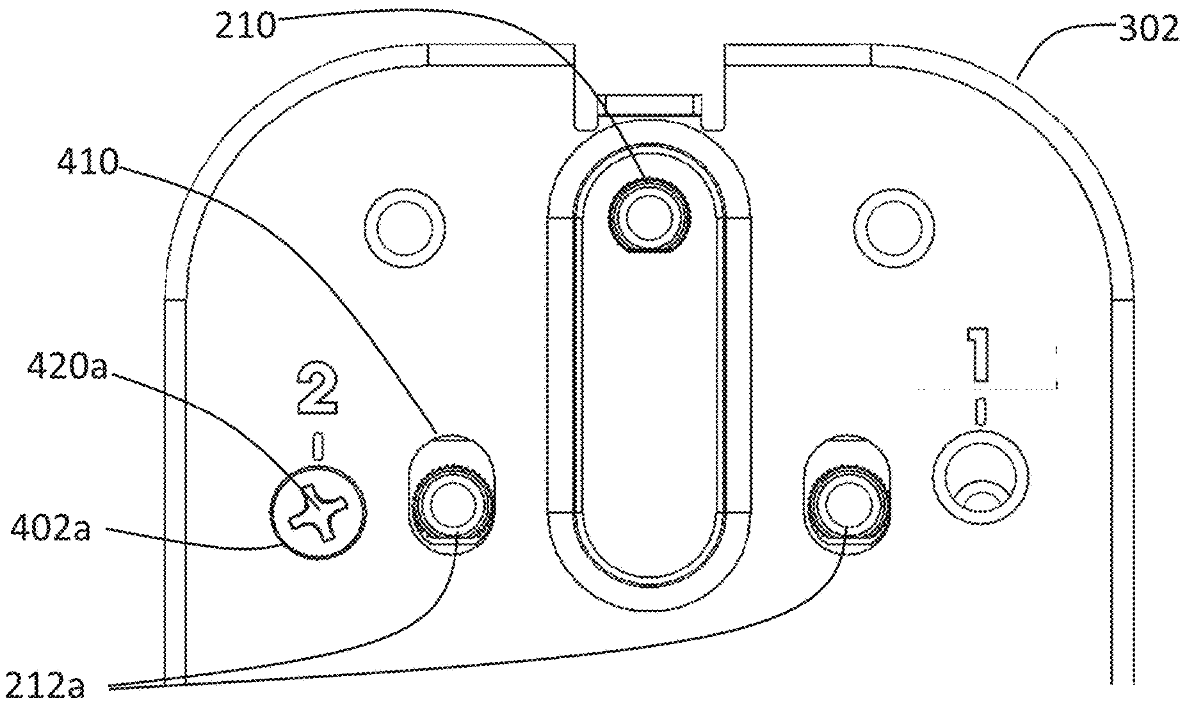
FIG. 7B shows a rear view of an upper portion of the mounting plate with the sliding attachment bracket in a second position.

FIG. 7A shows a rear view of an upper portion of the mounting plate 302 with the sliding attachment bracket 212*a* in a first position. Screw 420*a* is shown in the first position fastener hole 401*a*. The sliding attachment bracket can be seen in an upper portion of aperture 410. FIG. 7B shows a rear view of an upper portion of the mounting plate 302 with the sliding attachment bracket 212*a* in a second position. Screw 420*a* is shown in the second position fastener hole 402*a*. The sliding attachment bracket can be seen in a lower portion of aperture 410.

According to the illustrated embodiment in FIGS. 7A-7B, the sliding attachment bracket 212*a* (and likewise for sliding attachment bracket 212*b*, not shown) may be moved between a first position (FIG. 7A) and a second position (FIG. 7B) when the lock is removed from a door, without disassembling the trim except for the removal and reinsertion of screws 420*a* (upper) and 420*b* (lower). For example, with the trim removed from the door (such as a trim that is yet to be installed), a user would remove screw 420*a* from first position fastener hole 401*a*, move the sliding attachment bracket 212*a* from a first position to a second position and insert the screw 420*a* into the second position fastener hole 402*a*. A similar process may be performed for the lower sliding attachment bracket 212*b* relative to the lower screw 420*b* and the lower first and second position fastener holes 401*b* and 402*b* respectively. Moving the sliding attachment bracket between positions may be done by hand and without further disassembly of the trim, such as without disassembling the chassis 202. The retaining plate of the sliding attachment bracket may remain disposed between the mounting plate and the escutcheon of the chassis while the sliding attachment bracket is moved. Likewise, the attachment posts may remain within their respective apertures as the sliding attachment bracket is moved between positions.

Figure 8:
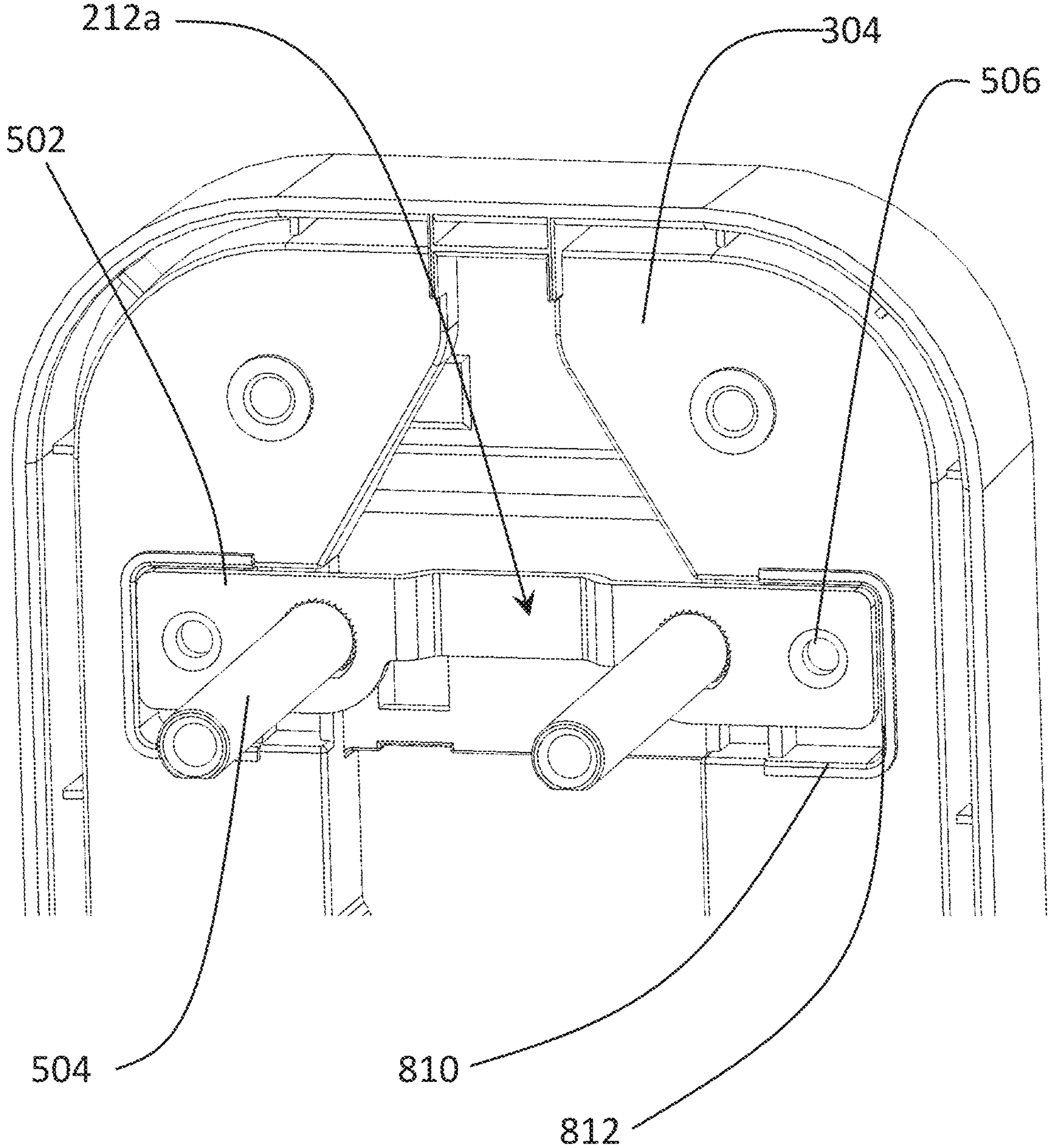
FIG. 8 illustrates a rear view of the escutcheon of the door lock trim of FIG. 2.

FIG. 8 illustrates a view of the escutcheon of the trim looking away from the face of the door for the embodiment illustrated in the previous figures. In the illustrated embodiment, the retaining plate 502 of the sliding attachment bracket 212*a* or sliding attachment bracket 212*b* is shown within the retaining plate disposed within a pocket 810 of the escutcheon 304. As illustrated, the pocket includes guiding surfaces 812 forming transverse ends of the pocket and abutting edges of the retaining plate 502. As illustrated, the sliding attachment bracket is configured to move in a vertical direction (e.g., along the length of a door). The retaining plate may move within the pocket in the vertical direction (vertical as illustrated in FIG. 8) but may be substantially inhibited from moving in a transverse direction by an edge of the retaining plate abutting the guiding surface 812 formed by the pocket 810. Likewise, rotation of the sliding attachment bracket 212*a* about an axis parallel with the attachment posts (e.g., the attachment post axis) is mitigated by interaction between the retaining plate 502 and the guiding surface(s) 812. The mounting plate is not shown in FIG. 8, but would cover at least the retaining plate 502 of the sliding attachment bracket 212*a* and retain the sliding attachment bracket in the chassis.

Although the illustrated embodiment shows the guiding surfaces as a part of the pocket, in other embodiments the guiding surfaces may be formed separately from a pocket, such as by forming a ridge or wall which interacts with a portion of sliding attachment bracket to influence a linear or rotational motion of the sliding attachment bracket. In some embodiments, the guiding surfaces may be several discrete surfaces, such as a series of posts, pins etc. that may interact with the sliding attachment bracket (including with portions of the sliding attachment bracket that may not be the retaining plate). In some embodiments, the apertures may be slots in the chassis (including the mounting plate portion of the chassis) that may serve as guiding surfaces, that is the aperture may limit the direction and/or travel of the sliding attachment bracket. The guiding surfaces may inhibit the linear motion of the sliding attachment bracket in any direction or combination of directions as well as in rotation.

Figure 9:
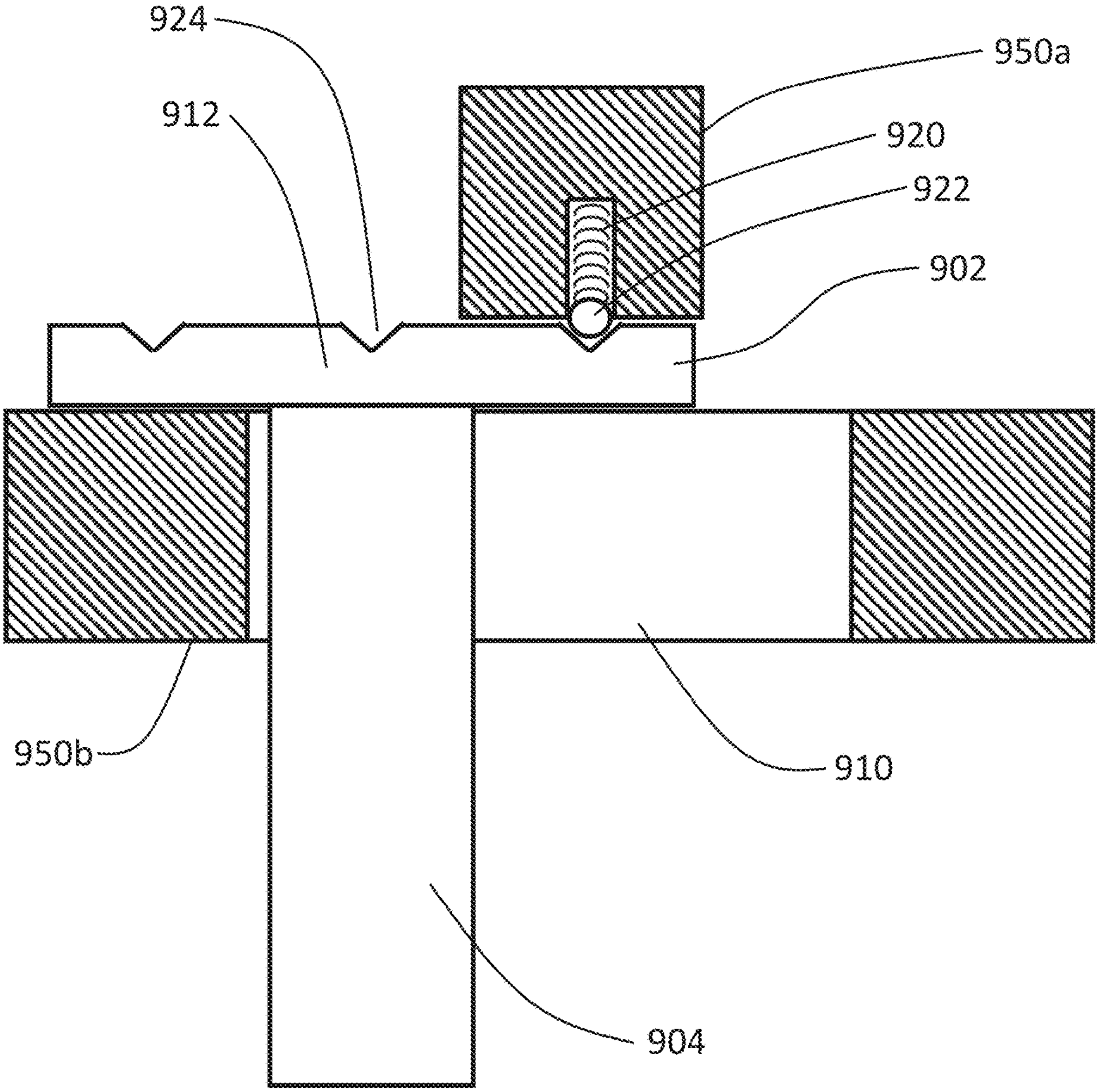
FIG. 9 shows a section view of another embodiment of a sliding attachment bracket including detents.

FIG. 9 shows a section view of a schematic of another embodiment of a sliding attachment bracket where the sliding attachment bracket may be biased into one of a plurality of positions by a detent. An embodiment of a sliding attachment bracket 912 is shown including retaining plate 902 and attachment post 904. The sliding attachment bracket is supported to slide relative to a chassis, portions of the chassis 950*a* and 950*b* are shown in section. The attachment post 904 passes through aperture 910 (which may be a slot) in chassis 950*b*. The illustrated embodiment includes a detent to bias the sliding attachment bracket 912 into one of several positions. The detent includes a ball check 922 compressed by a spring 920 held by the portion of the chassis 950*a*. The ball check 922 of the detent engages with one of several notches 924 on the sliding attachment bracket 912, such as in the retaining plate 902 as illustrated. A user may reposition the sliding attachment bracket by pushing it from the biased position. After a certain force threshold is reached, the ball check 922 may be forced upward by a portion of notch 924, partially compressing spring 920. The force threshold may be determined by parameters such as the size of the ball check, the shape/depth of the notch, the stiffness of the spring, coefficients of friction and other parameters. Once force threshold is reached, the ball check 922 may be expelled from the notch 924 as the sliding attachment bracket 912 begins to translate. With the ball check released from the notch, the sliding attachment bracket may move more easily until the next notch is reached. The ball check may then enter that notch, biasing the sliding attachment bracket into the corresponding position. The force threshold may be strong enough to permit the sliding attachment bracket to remain in the biased position during installation onto a door (e.g., strong enough to remain biased in any orientation of the chassis and remain biased while a user moves the chassis into alignment and installs fasteners to the attachment posts). The force threshold may be weak enough to permit the sliding attachment bracket to be manually positioned by a user, such as to be positioned without the use of tools.

Although the embodiment of FIG. 9 illustrates three notches 924 corresponding to three positions of the attachment plate, the detent may engage any number of notches corresponding to any number of positions of the sliding attachment bracket. A sliding adjustment bracket may have two positions (as with the previously described embodiments), three positions, four positions or more than four positions. In some embodiments, a sliding adjustment bracket may be continuously variable within a range and a detent may function as a friction mechanism to hold the sliding adjustment bracket in any position within a range of possible positions. In other embodiments, a pair of magnets may replace the ball check and notches to bias the sliding attachment bracket into a position where the pair of magnets aligns. An over center mechanism, toggle mechanism or other mechanical arrangement may alternatively bias the sliding adjustment bracket in a position.

Figure 10:
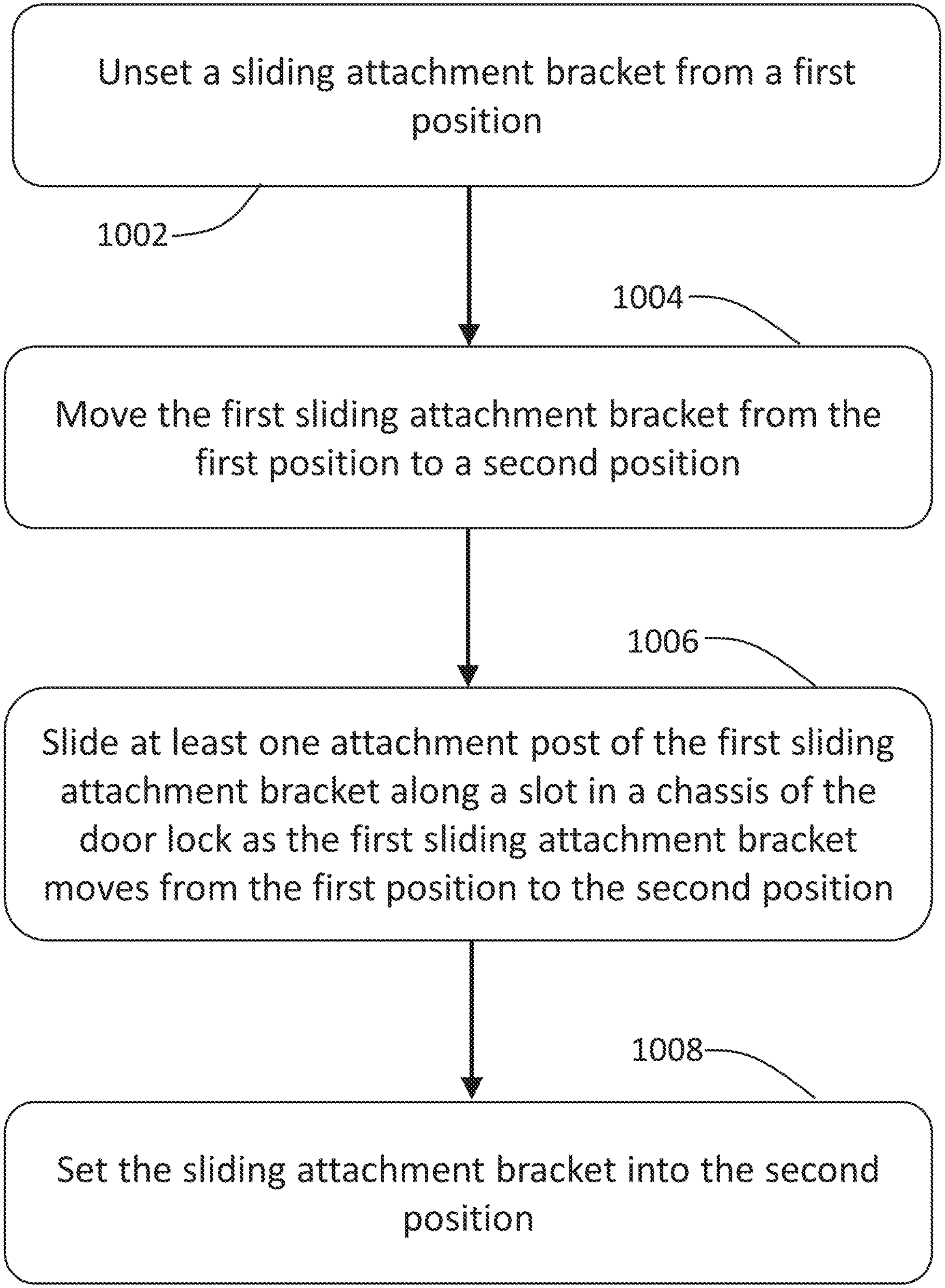
FIG. 10 shows a flow chart for an embodiment of a method of mounting a door lock trim.

FIG. 10 shows a schematic for a method of mounting a door lock. A first step may include unsetting a first sliding attachment bracket from a first position in block 1002. In the first position the trim is configured to mount to a first mating exit device or a first mating door trim. Next, the first sliding attachment bracket may be moved from the first position to a second position where the second position is different from the first position in block 1004. Moving the first sliding attachment bracket from a first position to a second position may include sliding at least one attachment post of the first sliding attachment bracket along an aperture in a chassis in block 1006 as the first sliding attachment bracket moves from the first position to the second position. The first sliding attachment bracket may then be set into the second position in block 1008. In the second position the trim is configured to mount to a second exit device different from the first exit device. The method may be repeated for a second and/or subsequent sliding attachment brackets such as moving a second sliding attachment bracket from a third position to a fourth position. Note that while some embodiments may include markings to signify the position of the sliding attachment bracket (for instance, sec marking 422, FIG. 4), first and second position, or third and fourth position etc. as used in this disclosure may not correspond with any specific numbers and/or symbols used in the markings, and any suitable marking may be employed to indicate a position.

Setting the sliding attachment bracket may include securing the sliding attachment bracket with a screw. In other embodiments, the sliding attachment bracket may be set in a position by being biased with a detent, a magnet, a pin or push to engage fastener, wedge or other fastener. In some embodiments such as in the case of a detent or magnetic biasing, the sliding attachment bracket may be unbiased by exceeding some force threshold where the sliding attachment bracket may move such as to a new position after the threshold is exceeded. In some embodiments, the sliding attachment bracket may be set/unset or biased/unbiased without the use of tools, such as by exceeding the force threshold of a detent or magnet, or by removing and reinserting a wedge, pin, or push to insert fastener that a user may be able to remove and install with their hands. A user may take an action to set the sliding attachment bracket (e.g., with the screw) or biasing may follow from the movement of the sliding attachment bracket, with or without a separate user action. In some embodiments, an attachment bracket may be biased to one or more positions, but may be set in one of the one or more positioned by a fastener such as a screw.

A method of mounting a door lock may include attaching the door trim (e.g., a first portion of a door lock) to another door lock component (another trim and/or exit device). Attaching the first portion of the door time to the other door lock component may include inserting a fastener through the second door lock or exit device and engaging the fastener with an end portion of one or more attachment posts of the first portion of door lock. In some embodiments, the end portion of the one or more attachment posts may be received by or pass through the other door lock component prior to receiving the fastener.

A method of mounting a door lock may include operatively connecting a tailpiece of a door trim with another door lock component such as another trim, exit device, or door latch. The tailpiece may operatively connect to an exit device on an opposing side of a door. The door trim may be operated by rotating a door handle/door knob of trim to cause the tailpiece to rotate and the door to unlatch, thereby allowing the door to be opened by pushing or pulling the door.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A mounting system for a door lock, the mounting system comprising:

a chassis comprising a pocket; and a sliding attachment bracket comprising:

at least one attachment post extending parallel to an attachment post axis; and a retaining plate affixed to the at least one attachment post, wherein the pocket is configured to receive the retaining plate, wherein the pocket is configured to allow the retaining plate to slide orthogonal to the attachment post axis, wherein the pocket is further configured to inhibit rotation of the retaining plate about the attachment post axis, and wherein the sliding attachment bracket comprises a first hole and a second hole each configured to receive a fastener, the chassis comprises a third hole and a fourth hole, when the sliding attachment bracket is in a first position in the pocket the first hole aligns with the third hole to allow the fastener to be received through the third hole into the first hole, and when the sliding attachment bracket is in a second position the second hole aligns with the fourth hole to allow the fastener to be received through the fourth hole into the second hole, and the first hole is not aligned with the third hole when the second hole is aligned with the fourth hole.

2. The mounting system of claim 1, wherein the chassis comprises a mounting plate and an escutcheon and wherein the pocket is between the mounting plate and the escutcheon, and wherein the third hole and the fourth hole are formed in the mounting plate.

3. The mounting system of claim 1, wherein the fastener is a screw and wherein the first hole and the second hole are threaded.

4. A mounting system for a door lock, the mounting system comprising:

a chassis;

a fastener, and an attachment bracket configured to move between a first position and a second position relative to the chassis, wherein the attachment bracket comprises:

at least one attachment post extending along an attachment post axis, a retaining plate affixed to the at least one attachment post, a first hole, and a second hole, wherein the chassis further comprises at least one aperture through which the at least one attachment post passes, wherein the chassis further comprises a third hole and a fourth hole, wherein when the attachment bracket is in the first position the first hole aligns with the third hole to allow the fastener to be received through the third hole into the first hole, and wherein when the attachment bracket is in the second position the second hole aligns with the fourth hole to allow the fastener to be received through the fourth hole into the second hole.

5. The mounting system of claim 4, wherein the chassis further comprises a pocket configured to receive the retaining plate of the attachment bracket and inhibit rotation of the attachment bracket about the attachment post axis.

6. The mounting system of claim 4 wherein the chassis further comprises a mounting plate and an escutcheon and wherein the attachment bracket is disposed between the mounting plate and the escutcheon.

7. The mounting system of claim 4, wherein the at least one attachment post is two attachment posts affixed to the retaining plate.

8. The mounting system of claim 4, wherein the attachment bracket is a first attachment bracket, wherein the mounting system further comprises a second attachment bracket comprising:

at least one second attachment post extending parallel to the attachment post axis, and a second retaining plate affixed to the at least one second attachment post.

9. The mounting system of claim 4, wherein the fastener is a screw and the first hole and the second hole are threaded.

10. The mounting system of claim 4, wherein in the first position the attachment bracket is configured to remain in the first position, and wherein in the second position the attachment bracket is configured to remain in the second position.

11. The mounting system of claim 4, wherein the at least one attachment post comprises a first end portion affixed to the retaining plate and a second end portion, and wherein the second end portion is configured to receive a fastener.

12. The mounting system of claim 4, wherein the chassis further comprises a mounting plate and an escutcheon and wherein the attachment bracket is held between the mounting plate and the escutcheon, and wherein the mounting plate further comprises the at least one aperture configured to allow passage of the at least one attachment post therethrough and wherein the at least one aperture is configured to allow the attachment bracket to move between the first position and the second position while the at least one attachment post remains within the at least one aperture.

13. The mounting system of claim 4 further comprising a fixed attachment post affixed to the chassis, the fixed attachment post being rigidly mounted to the door lock in a single position.

* * * * *